W. H. WASHBURNE.
VALVE.
APPLICATION FILED JUNE 21, 1919.
1,367,444.
Patented Feb. 1, 1921.
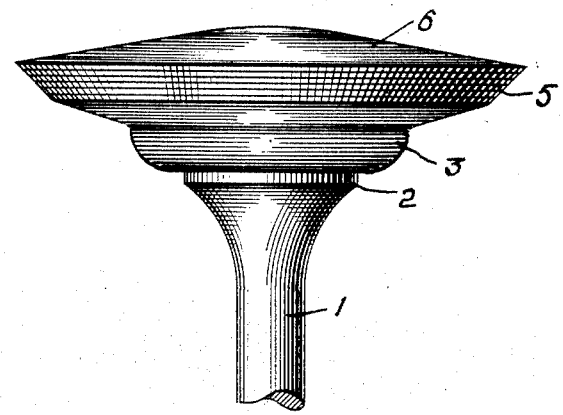
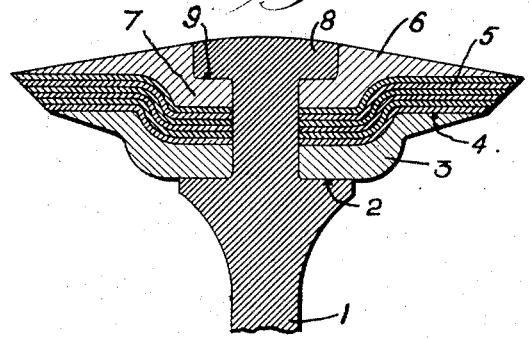
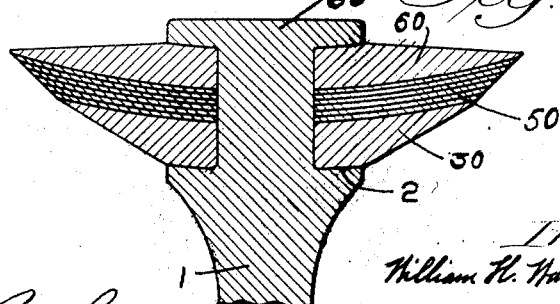
Witness:
Harry S. Gaither
Inventor:
William H. Washburne,
by Chamberlin & Freudenreich,
Attys

UNITED STATES PATENT OFFICE.

WILLIAM H. WASHBURNE, OF CHICAGO. ILLINOIS, ASSIGNOR TO SELF-SEATING VALVE COMPANY, OF CHICAGO, ILLINOIS, A CORPORATION OF ILLINOIS.

VALVE.

1,367,444.      Specification of Letters Patent.      Patented Feb. 1, 1921.

Application filed June 21, 1919. Serial No. 305,741.

*To all whom it may concern:*

Be it known that I, WILLIAM H. WASHBURNE, a citizen of the United States, residing at Chicago, county of Cook, State of Illinois, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates particularly to frusto-conical valves of the laminated type and has for its object to improve the construction of the same.

The purpose in making frusto-conical valves laminated is to cushion them against blows, make them seat tightly, regardless of slight irregularities in the contacting surfaces, and produce more or less of a scraping action between the contacting surfaces tending to keep them clean. In attempting to secure these qualities in valves there has always been, so far as I am aware, too much flexibility or the wrong kind of flexibility, thereby defeating the intended purpose through a spreading or separation of the laminæ at the edges and permitting the entrance of flame, hot gases, and solid foreign matter.

In my prior application Serial No. 297,063 I have illustrated a laminated valve possessing the requisite flexibility to give it the desired cushioning, seating and cleaning capacity, without being of such a construction that the laminæ will spread apart at the edges so as to admit the entry of solid foreign matter or of hot gases between the laminæ. In that valve the laminæ are made in the form of flat disks which makes it necessary that the central portion of the head of the valve project into the valve chamber a distance at least equal to the greatest thickness of the end or outermost holding plate. The tendency in modern gas engine design is toward large valve openings and small valve chambers and, the greater the height of the valve above the transverse plane containing the upper or outer marginal edge of the bearing face, the higher must be the valve chamber in order to permit a predetermined area of valve opening to be obtained when the valve is lifted.

Therefore, while my invention may be said to have the same general objects as set forth in the aforesaid application; specifically considered, the present invention has for its object to produce a laminated frusto-conical valve which will require a minimum clearance above the same in order to obtain a maximum valve opening and, in addition, a valve which may be made in large diameters without being unduly thick and heavy for the purpose of mechanical strength.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a valve arranged in accordance with the present invention;

Fig. 2 is an axial section through the valve; and

Fig. 3 is a view similar to Fig. 2, showing a slight modification.

Referring to the drawing, 1 represents a valve stem having an annular shoulder, 2, located a short distance from one end and directed toward said end. On the shoulder rests a dished plate, 3, having its concave side directed upwardly or outwardly. In the arrangement shown in Fig. 1 the plate is provided with a flat annular rim as indicated at 4. A series of laminæ, 5, in the form of dished disks nested together overlie the member 3; each disk having a flat peripheral portion corresponding to the flat rim of the member 3. For the sake of clearness of illustration, only a few laminæ are illustrated, but it will of course be understood that in practice there may be any desired number and they may be made of any desired degree of thinness.

Lying upon the laminated body of the valve is a top or outer holding plate, 6, having a central hub portion, 7, which fits down into the depressed center of the laminated body. The holding plate is locked in place by means of a suitable head or shoulder, 8, on the extreme end of the valve stem; the member 8 fitting into a socket or recess, 9, of the holding plate so that it does not form a projection above the latter.

The periphery of the valve head comprising the laminated body and the two clamping plates is finished so as to have the shape of a frustum of a cone the smallest diameter of which is at the plate 3 while the greatest diameter is at the plate 6. In other words, the two clamping plates are carried outwardly into the bearing face of the valve.

The flat marginal portions of the two clamping plates are gradually tapered until they may be said to have narrow annular marginal elements possessing a degree of flexibility sufficient to make the valve head as a whole slightly flexible in the vicinity of its working face. The main portion of the head is, however, as rigid as a solid head.

The flat marginal portions of the laminæ and holding plates may be omitted if desired, thus making the construction simpler than that shown in Fig. 2 and permitting all of the laminæ to be formed in the same dies. Such an arrangement is shown in Fig. 3 wherein the plates, 30 and 60, corresponding to the plates 3 and 6 of the other form, have their whole clamping faces made respectively concave and convex. The laminæ 50 are simple dished disks having no flat portions. The head or shoulder, 80, on the end of the valve stem may, if desired, overlie the outer surface of the outer holding plate, 60, instead of being seated in a recess in the latter as shown in Figs. 1 and 2.

I am thus enabled to produce a valve which is slightly flexible in the immediate vicinity of the bearing face, is for the major part rigid, and does not pass abruptly from extreme rigidity to extreme flexibility. Moreover, by making the laminæ dish-shaped, the thick portions of the clamping plates are deflected inwardly or downwardly so as to give the valve a comparatively flat end which avoids the necessity of an unduly high valve chamber in order to afford the proper clearance during the operation of the valve.

While I have illustrated and described with particularity only a single preferred form of my invention, with a slight modification, I do not desire to be limited to the exact structural details thus illustrated and described; but intend to cover all forms and arrangements which come within the terms employed in the definitions of my invention constituting the appended claims.

I claim:

1. A valve comprising a body of thin disks and clamping plates between which said disks lie, one of said plates having a concave clamping face, the disks being dished to conform to said concavity, and the other plate having a convex clamping face engaging the concave side of the adjacent disk.

2. A frusto-conical valve comprising stiff end plates slightly flexible at the margins, a body of thin disks arranged between said plates, the central portions of the disks being deflected axially toward the smaller end of the valve, and means for clamping said plates and disks together.

3. A frusto-conical valve comprising stiff end plates slightly flexible at the margins, a body of thin disks arranged between said plates, means for clamping said plates and disks together, the edges of said plates lying in the valve face, and the central portions of the disks being deflected axially toward the smaller end of the valve.

4. A frusto-conical valve comprising a body of thin flexible disks lying upon each other, stiff end plates one lying above and the other below said disks, and means for clamping said end plates and disks together, each of said plates being of approximately the same diameter as the adjacent disk, the central portions of the disks being deflected axially toward the smaller end of the valve, and each of the plates having a marginal portion reduced in thickness to approximately the thickness of one of the disks.

In testimony whereof, I sign this specification.

WILLIAM H. WASHBURNE.